(12) United States Patent
Anburaj

(10) Patent No.: US 8,160,096 B1
(45) Date of Patent: Apr. 17, 2012

(54) METHOD AND SYSTEM FOR RESERVING BANDWIDTH IN TIME-DIVISION MULTIPLEXED NETWORKS

(75) Inventor: Michael Anburaj, Mountain House, CA (US)

(73) Assignee: Tadaaki Chigusa, Tokyo (JP)

( * ) Notice: Subject to any disclaimer, the term of this patent is extended or adjusted under 35 U.S.C. 154(b) by 748 days.

(21) Appl. No.: 11/636,063

(22) Filed: Dec. 6, 2006

(51) Int. Cl.
*H04J 3/16* (2006.01)

(52) U.S. Cl. ......... 370/468; 370/255; 370/329; 370/345

(58) Field of Classification Search .................. 370/468, 370/254, 255, 329, 345, 346, 348; 375/400
See application file for complete search history.

(56) References Cited

U.S. PATENT DOCUMENTS

| | | |
|---|---|---|
| 4,062,015 A | 12/1977 | Litva |
| 4,114,157 A | 9/1978 | Hirata |
| 4,835,463 A | 5/1989 | Baran et al. |
| 4,929,958 A | 5/1990 | Hodal |
| 4,939,726 A | 7/1990 | Flammer |
| 5,007,052 A | 4/1991 | Flammer |
| 5,075,696 A | 12/1991 | Wilby |
| 5,079,768 A | 1/1992 | Flammer |
| 5,095,535 A | 3/1992 | Freeburg |
| 5,115,433 A | 5/1992 | Baran et al. |
| 5,130,987 A | 7/1992 | Flammer |
| 5,223,790 A | 6/1993 | Baran et al. |
| 5,243,536 A | 9/1993 | Bradford |
| 5,338,332 A | 8/1994 | Baran et al. |
| 5,365,516 A | 11/1994 | Jandrell |
| 5,400,338 A | 3/1995 | Flammer, III |
| 5,406,249 A | 4/1995 | Pettus |
| 5,412,654 A | 5/1995 | Perkins |
| 5,453,977 A | 9/1995 | Flammer, III et al. |
| 5,465,398 A | 11/1995 | Flammer |
| 5,471,469 A | 11/1995 | Flammer, III et al. |
| 5,479,176 A | 12/1995 | Zavrel, Jr. |
| 5,479,400 A | 12/1995 | Dilworth et al. |
| 5,485,393 A | 1/1996 | Bradford |
| 5,488,608 A | 1/1996 | Flammer, III |
| 5,515,369 A | 5/1996 | Flammer, III et al. |

(Continued)

FOREIGN PATENT DOCUMENTS

EP 0789468 A1 8/1997

(Continued)

OTHER PUBLICATIONS

IEEE Std 802.11, 1999/8802-11 (ISO/IEC 8802-11:1999) Std for Info Technology—LAN/MAN—Specific requirements—Part 11: Wireless LAN (MAC) and PHY Specs, IEEE NY, NY (528 pages).

(Continued)

*Primary Examiner* — Luat Phung
(74) *Attorney, Agent, or Firm* — Silicon Valley Patent Group LLP

(57) ABSTRACT

Methods and systems for reserving bandwidth in communications networks (e.g., time-division multiplexed (TDM) networks). A bandwidth request on a forward path of the communications network is temporarily held without any fixed slot timings. The bandwidth request is held for a time long enough for the request to travel the forward path end-to-end. Once the request reaches the destination of the forward path, the temporary bandwidth is confirmed by sending a bandwidth confirmation message back from destination to the source of the path. Each slave node along the path performs an allocation confirm with its associated master node, which responds by converting the temporary holds to full allocations by fixing slot timings.

30 Claims, 8 Drawing Sheets

U.S. PATENT DOCUMENTS

| | | |
|---|---|---|
| 5,526,357 A | 6/1996 | Jandrell |
| 5,570,084 A | 10/1996 | Ritter et al. |
| 5,636,216 A | 6/1997 | Fox et al. |
| 5,664,194 A | 9/1997 | Paulsen |
| 5,703,602 A | 12/1997 | Casebolt |
| 5,736,959 A | 4/1998 | Patterson |
| 5,745,483 A | 4/1998 | Nakagawa et al. |
| 5,745,884 A | 4/1998 | Carnegie |
| 5,764,487 A | 6/1998 | Natsume |
| 5,767,807 A | 6/1998 | Pritchett |
| 5,774,344 A | 6/1998 | Casebolt |
| 5,787,077 A | 7/1998 | Kuehnel |
| 5,793,842 A | 8/1998 | Schloemer |
| 5,802,447 A | 9/1998 | Miyazaki |
| 5,818,828 A | 10/1998 | Packer et al. |
| 5,892,908 A | 4/1999 | Hughes |
| 5,901,143 A | 5/1999 | Rotter |
| 5,903,566 A | 5/1999 | Flammer, III |
| 5,946,615 A | 8/1999 | Holmes et al. |
| 6,026,303 A | 2/2000 | Minamisawa |
| 6,028,853 A | 2/2000 | Haartsen |
| 6,041,232 A | 3/2000 | Jennings, III |
| 6,049,593 A | 4/2000 | Acampora |
| 6,072,994 A | 6/2000 | Phillips |
| 6,104,712 A | 8/2000 | Robert et al. |
| 6,160,647 A | 12/2000 | Gilliland |
| 6,173,191 B1 | 1/2001 | Jennings, III |
| 6,192,230 B1 | 2/2001 | van Bokhorst et al. |
| 6,198,728 B1 | 3/2001 | Hulyalkar |
| 6,298,053 B1 | 10/2001 | Flammer, III et al. |
| 6,304,556 B1 | 10/2001 | Haas |
| 6,307,843 B1 | 10/2001 | Okanoue |
| 6,314,163 B1 | 11/2001 | Acampora |
| 6,327,918 B1 | 12/2001 | Lawless |
| 6,329,902 B1 | 12/2001 | Lee et al. |
| 6,330,438 B1 | 12/2001 | McClelland |
| 6,349,206 B1 | 2/2002 | Reichelt |
| 6,430,395 B2 | 8/2002 | Arazi |
| 6,456,675 B2 | 9/2002 | Wagner |
| 6,522,881 B1 | 2/2003 | Feder |
| 6,580,700 B1 | 6/2003 | Pinard |
| 6,590,928 B1 | 7/2003 | Haartsen |
| 6,728,554 B1 | 4/2004 | Wegner |
| 6,801,790 B2 | 10/2004 | Rudrapatna |
| 6,816,706 B1 | 11/2004 | Hohnstein |
| 6,888,811 B2 | 5/2005 | Eaton |
| 7,015,809 B1 | 3/2006 | Sayers |
| 7,042,394 B2 | 5/2006 | Sayers |
| 7,221,268 B2 | 5/2007 | Sayers |
| 7,280,073 B2 | 10/2007 | Sayers |
| 7,301,895 B2 * | 11/2007 | Saleh et al. ............ 370/218 |
| 7,349,360 B2 * | 3/2008 | Gutierrez et al. ............. 370/315 |
| 2001/0002908 A1 | 6/2001 | Rune et al. |
| 2001/0003191 A1 | 6/2001 | Kovacs et al. |
| 2001/0005368 A1 | 6/2001 | Rune |
| 2001/0012757 A1 | 8/2001 | Boyle |
| 2001/0013856 A1 | 8/2001 | Hamakada et al. |
| 2001/0016909 A1 | 8/2001 | Gehrmann |
| 2001/0018336 A1 | 8/2001 | Okajima et al. |
| 2001/0022780 A1 | 9/2001 | Mizutani et al. |
| 2001/0024443 A1 | 9/2001 | Alriksson et al. |
| 2001/0029166 A1 | 10/2001 | Rune et al. |
| 2001/0031626 A1 | 10/2001 | Lindskog et al. |
| 2001/0033248 A1 | 10/2001 | Owechko |
| 2001/0033556 A1 | 10/2001 | Krishnamurthy et al. |
| 2001/0045914 A1 | 11/2001 | Bunker |
| 2001/0049295 A1 | 12/2001 | Matsuoka |
| 2002/0004817 A1 | 1/2002 | Pham et al. |
| 2002/0016838 A1 | 2/2002 | Geluc et al. |
| 2002/0018448 A1 | 2/2002 | Amis et al. |
| 2002/0054575 A1 | 5/2002 | Cho |
| 2003/0038747 A1 | 2/2003 | Patel |
| 2003/0087650 A1 | 5/2003 | Aarnio |
| 2003/0161268 A1 | 8/2003 | Larsson |
| 2004/0022224 A1 * | 2/2004 | Billhartz ............... 370/338 |
| 2004/0114521 A1 * | 6/2004 | Sugaya ............... 370/238 |
| 2004/0156312 A1 * | 8/2004 | Salonidis et al. ............ 370/229 |
| 2004/0203820 A1 * | 10/2004 | Billhartz ............... 455/452.1 |
| 2004/0223476 A1 | 11/2004 | Jose |
| 2005/0088980 A1 * | 4/2005 | Olkkonen et al. ............ 370/255 |
| 2005/0129000 A1 * | 6/2005 | Sivakumar et al. ............ 370/351 |
| 2005/0277808 A1 | 12/2005 | Sonnenschein |
| 2006/0176829 A1 * | 8/2006 | McLaughlin et al. ........ 370/252 |
| 2007/0002551 A1 | 1/2007 | Ger |
| 2007/0109980 A1 | 5/2007 | Awater |
| 2007/0109989 A1 * | 5/2007 | Nakagawa et al. ............ 370/328 |

FOREIGN PATENT DOCUMENTS

| | | |
|---|---|---|
| EP | 0852407 A2 | 8/1998 |
| EP | 1202389 A1 | 5/2002 |
| JP | 09-083528 | 3/1997 |
| JP | 11-239154 | 8/1999 |
| WO | 95/28780 A1 | 10/1995 |
| WO | WO 95/28780 A1 | 10/1995 |
| WO | 96/00468 A1 | 1/1996 |
| WO | WO 96/00468 A1 | 1/1996 |
| WO | 97/09673 A1 | 3/1997 |
| WO | WO 97/09673 A1 | 3/1997 |
| WO | 00/16508 A1 | 3/2000 |
| WO | 01/26328 A2 | 4/2001 |
| WO | 01/86850 A1 | 11/2001 |
| WO | WO 01/86850 A1 | 11/2001 |
| WO | 02/19740 A1 | 3/2002 |
| WO | WO 02/19740 A1 | 3/2002 |
| WO | 2004/040692 A1 | 5/2004 |
| WO | 2005/074197 A1 | 8/2005 |

OTHER PUBLICATIONS

IEEE Std 802.11B-1999 Std for Telecomm and Info Exchange Between Systems—LAN/MAN Specific Requirements—Part 11: Wireless (MAC) & PHY Specs: 2.4 GHz Band, IEEE NY, NY (96 pages).

IEEE Std 802.16/2001 Std for Local and Metropolitan Area Netwks Part 16: Air Interface for Fixed Broadband Wireless Access Systems, IEEE 3 Park Avenue, New York, NY 10016-5997 (349 pages).

"3GPP TS 23.107 v6.3.0 Technical Specification Group Services and System Aspects; Quality of Service (OoS) concept and architecture (Release 6)," 3GPP Generation Partnership Project, Jun. 2005 (2005-2006), XP002354258 (40 pages).

"Digital cellular telecommunications system (Phase 2+); Universal Mobile Telecommunications System (UMTS); End-to-end Quality of Service (QoS) concept and architecture (3GPP TS 23.207 version 5.9.0 Release 5); ETSI TS 123207," ETSI Standards, European Telecommunications Standards Institute, Sophia-Antipo, FR, vol. 3-SA2, No. V590, Mar. 2004, XP0104016491 ISSN: 0000-0001 (48 pages).

PCT "Notification Concerning Transmittal of International Preliminary Report on Patentability", Int'l Search Authority, Int'l patent application PCT/US06/26552 dated Jan. 24, 2008 (6 pages).

PCT "Written Opinion" for PCT/US03/23623 dated May 24, 2004 (7 pages).

PCT "Notification of Transmittal of the International Search Report or the Declaration" for PCT/US03/23623 dated Mar. 5, 2004 (6 pages).

PCT "Notification of Transmittal of International Preliminary Examination Report" for PCT/US03/23623 dated Mar. 17, 2005 (8 pages).

EPO "Extended European Search Report" for EP 05254384.0 2411 dated Dec. 8, 2005 (9 pages).

EPO "European Search Report" for EP 05254384.0 2411 dated Aug. 9, 2007 (9 pages).

EPO "Extended European Search Report" for EP 05254385.7-2411 dated Dec. 27, 2005 (8 pages).

EPO "Extended European Search Report" for EP 05254385.7-2411 dated Aug. 17, 2007.

PCT "Notification of Transmittal of the International Search Report and the Written Opinion of the International Searching Authority", Int'l Search Authority, Int'l patent application PCT/ US06/26552 dated Feb. 5, 2007 (11 pages).

Machine Translation of Abstract of JP 11-239154, 1 page, Japan Aug. 31, 1999.

Machine Translation of Abstract of JP 09-083528, 1 page, Japan Mar. 28, 1997.

* cited by examiner

*Successful end-to-end reservation*

METHOD AND SYSTEM FOR RESERVING BANDWIDTH IN TIME-DIVISION MULTIPLEXED NETWORKS

FIELD OF THE INVENTION

The present invention relates to network communications, and in particular, to methods and systems for bandwidth reservation in communications networks.

BACKGROUND OF THE INVENTION

A conventional telecommunication network comprises a plurality of devices represented by "nodes" and a plurality of configurable communication links for communicating data (e.g., communication messages) among the nodes.

Networks may be configured according to any one of various types of network topologies. The multi-hop (or "mesh") network is one topology that has gained keen interest in the last several years. One reason for the heightened interest relates to the recent introduction of WiMAX (Worldwide Interoperability for Microwave Access). WiMAX is a wireless technology based on the IEEE 802.16 standard that contemplates use of mesh networks to provide last-mile wireless broadband access as an alternative to cable and DSL.

FIG. 1 is a high-level architectural diagram of a mesh network 100. The mesh network 100 comprises overlapping clusters 102-1, 102-2, 102-3 having associated pluralities of nodes 104-1, 104-2, 104-3, which represent the communication devices of the network. Each node in the network 100 is capable of communicating with any other node in the network 100, by configuring a multi-hop path between the source node and the destination node. One such multi-hop path, beginning at a source node 106-1 and ending at a destination node 106-3, is shown in FIG. 1. One or more nodes in a given cluster 102-1, 102-2, 102-3 may be permanently designated as a master node to facilitate formation of the end-to-end path. Alternatively, each node in a cluster may alternately operate as a master and slave node, and cooperate with other nodes to collectively facilitate formation of a multi-hop communications path between source and destination nodes.

A major challenge in implementing a mesh network involves managing and controlling traffic through the network. The network must be capable of determining the best path between source and destination nodes; must be able to simultaneously handle multiple messages; and must be capable of coordinating traffic flow in situations where a node must lend itself as a hop point for multiple messages carried along different paths of the network. Because the transmission capacity between link nodes is finite, bandwidth reservation schemes must be used to ensure that bandwidth is fairly distributed and that all messages are properly communicated from their respective sources to their intended destinations.

One bandwidth reservation technique used in conventional mesh networks that employ time-division multiplexing (TDM) is to typically perform a Layer 3 packet flow on a link-by-link basis. Master nodes along an end-to-end path between a source and destination node allocate bandwidth by reserving time slots in a fixed manner, one link after another along the path. FIG. 2A shows a new bandwidth allocation, Sres, made by a particular TDM master following already established or utilized station (e.g. slave node) bandwidth times, S1 and S5.

As used in FIGS. 2A-F, "S1" and "S5" represent established/utilized station bandwidth times. "Sres" represents a new bandwidth time (full allocation) for an end-to-end bandwidth reservation. "S3" and "S6" represent station bandwidth times allocated after the Sres reserved bandwidth. "Hole" represents bandwidth time released by an Sres station, due to an unsuccessful end-to-end bandwidth reservation.

Unfortunately, particularly when the network is large, success in achieving an end-to-end allocation is not fully guaranteed. When a bandwidth allocation is insufficient to allow a message to be communicated end-to-end, all fixed allocations made prior to the failure point must be released, for example, by sending an allocation release message to master nodes controlling the bandwidth allocation along the path. Before the fixed allocations can be released, however, there is a high probability that other nodes (e.g., nodes S3 and S6 in FIG. 2B) will acquire subsequent bandwidth slots to the one taken for this route. Unfortunately, as shown in FIG. 2C, releasing the previously allocated bandwidth leaves a time slot "hole" in the allocation.

The hole may be purged by moving it to the tail of the allocations, as shown in FIGS. 2D-F. However, the process needed to purge the hole is highly undesirable, since purging the hole requires that slot timings be readjusted and reconveyed to each of the nodes. This readjustment process has severe impacts on the network, including delaying communication of the message to the intended destination, increasing the amount of traffic on the scarce radio resource, and requiring additional processing power within each node.

It would be desirable, therefore, to have a system and method for allocating bandwidth in mesh networks, and other types of networks, which avoids the need for processing resources to purge allocated but unused bandwidth reservations.

BRIEF SUMMARY OF THE INVENTION

Methods and systems for reserving bandwidth in communications networks (e.g., time-division multiplexed (TDM) networks) are disclosed. According to an exemplary aspect of the invention, a bandwidth request on a forward path of a communications network is temporarily held without any fixed slot timings. The bandwidth request is held for a time long enough for the request to travel the forward path end-to-end. Once the request reaches the destination of the forward path, the temporary bandwidth is confirmed by sending a bandwidth confirmation message back from destination to the source of the path. Each slave node along the path performs an allocation confirm with its associated master node, which responds by converting the temporary holds to full allocations by fixing slot timings.

Further features and advantages of the present invention, as well as the structure and operation of various embodiments of the present invention, are described in detail below with respect to accompanying drawings, in which like reference numbers are used to indicate identical or functionally similar elements.

DETAILED DESCRIPTION OF THE INVENTION

Figure 1:
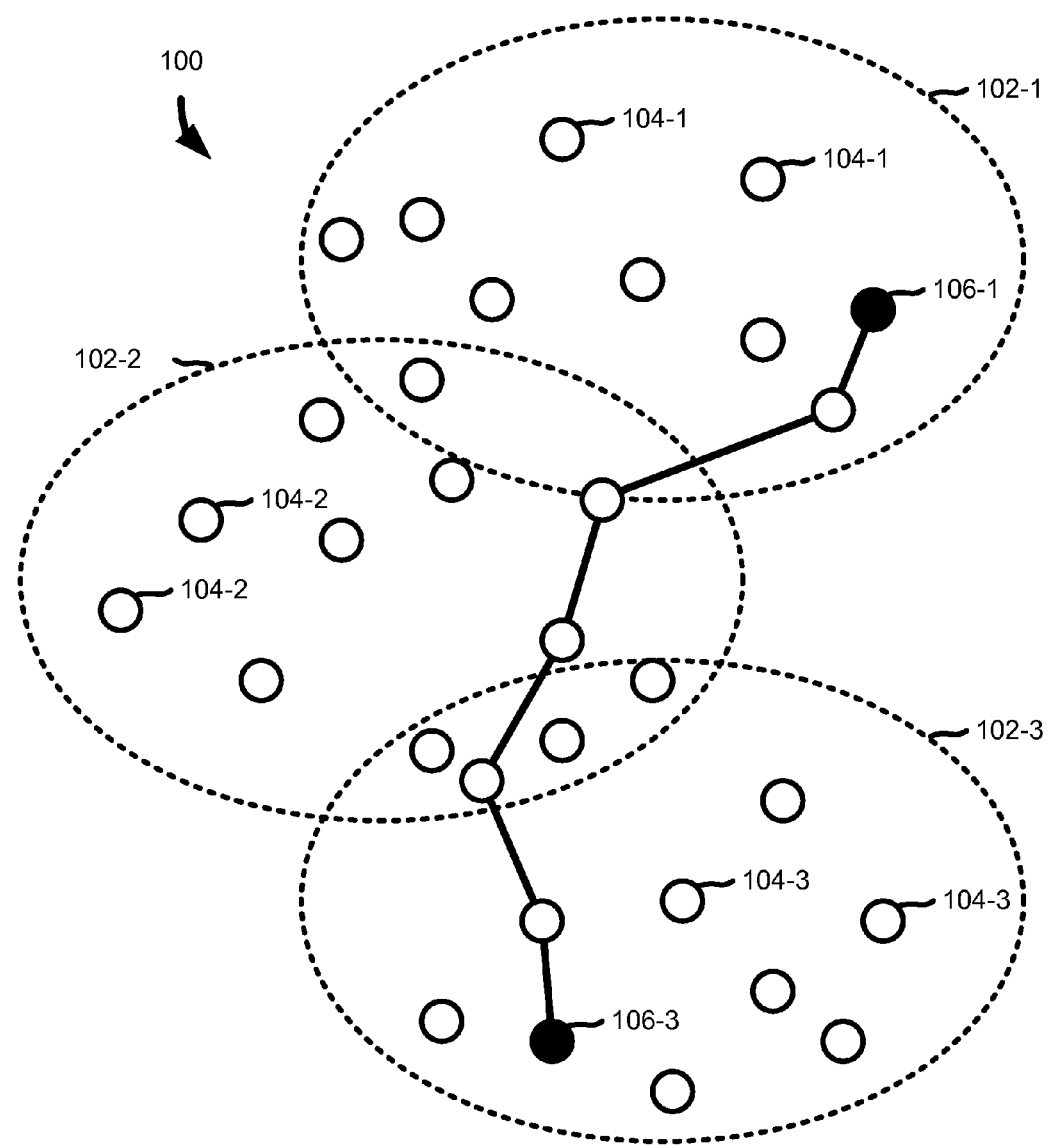
FIG. 1 is a high-level architectural diagram of a prior art mesh network.
Figure 2A:
FIGS. 2A-F are bandwidth time diagrams illustrating how a bandwidth "hole" is formed after releasing a previously allocated bandwidth time in a time-division multiplexed (TDM) network, and how the hole may be purged by proactively moving the hole to the tail of allocations.
Figure 2B:
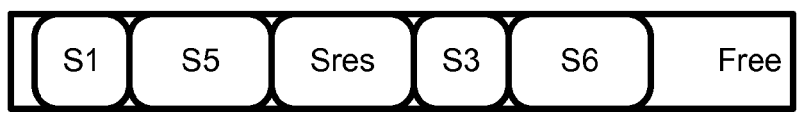
Figure 2C:
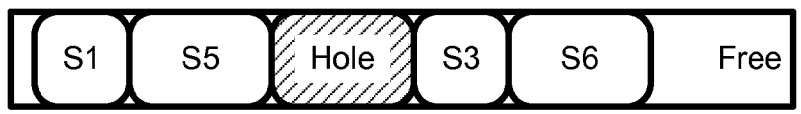
Figure 2D:
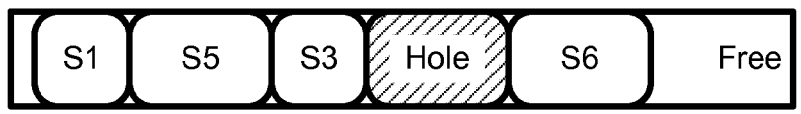
Figure 2E:
Figure 2F:
Figure 3A:
FIGS. 3A-D are bandwidth time diagrams illustrating a bandwidth allocation technique for communication networks, in accordance with an embodiment of the present invention.
Figure 3B:
Figure 3C:
Figure 3D:

Referring first to FIGS. 3A-D, there is shown a set of bandwidth allocation timing diagrams illustrating a bandwidth allocation technique for communication networks (e.g., TDM-based networks), according to an embodiment of the present invention. According to this embodiment of the invention, a bandwidth request made by a node on a forward path between source and destination nodes is accepted by a master station (i.e., master node) as a "temporary hold" as shown with "Sfh" in FIG. 3A (as opposed to the full reservation that takes place in FIG. 2). The temporary hold can be conceptualized as "floating" on top of full allocations (as seen in FIG. 3B after S3 has been allocated and as seen in FIG. 3C after S6 has been allocated), since it does not have any fixed slot timings associated with the allocation. The temporary hold "Sfh" holds the requested bandwidth for at least as long as the time needed to for the request to go end-to-end over a path between the source and destination nodes. In FIG. 3D, the temporarily held floating bandwidth "Sfh" is converted to a full allocation "Sx" (with fixed slot times).

As used in FIGS. 3A-D, "S1" and "S5" represent established/utilized station bandwidth times. "Sfh" represents a new bandwidth floating hold made for the end-to-end bandwidth reservation. "S3" and "S6" represent other station bandwidth times allocated after the Sfh reserved floating hold bandwidth. "Sx" represents the floating hold reserved bandwidth converted to a full allocation (with fixed slot times).

Figure 4A:
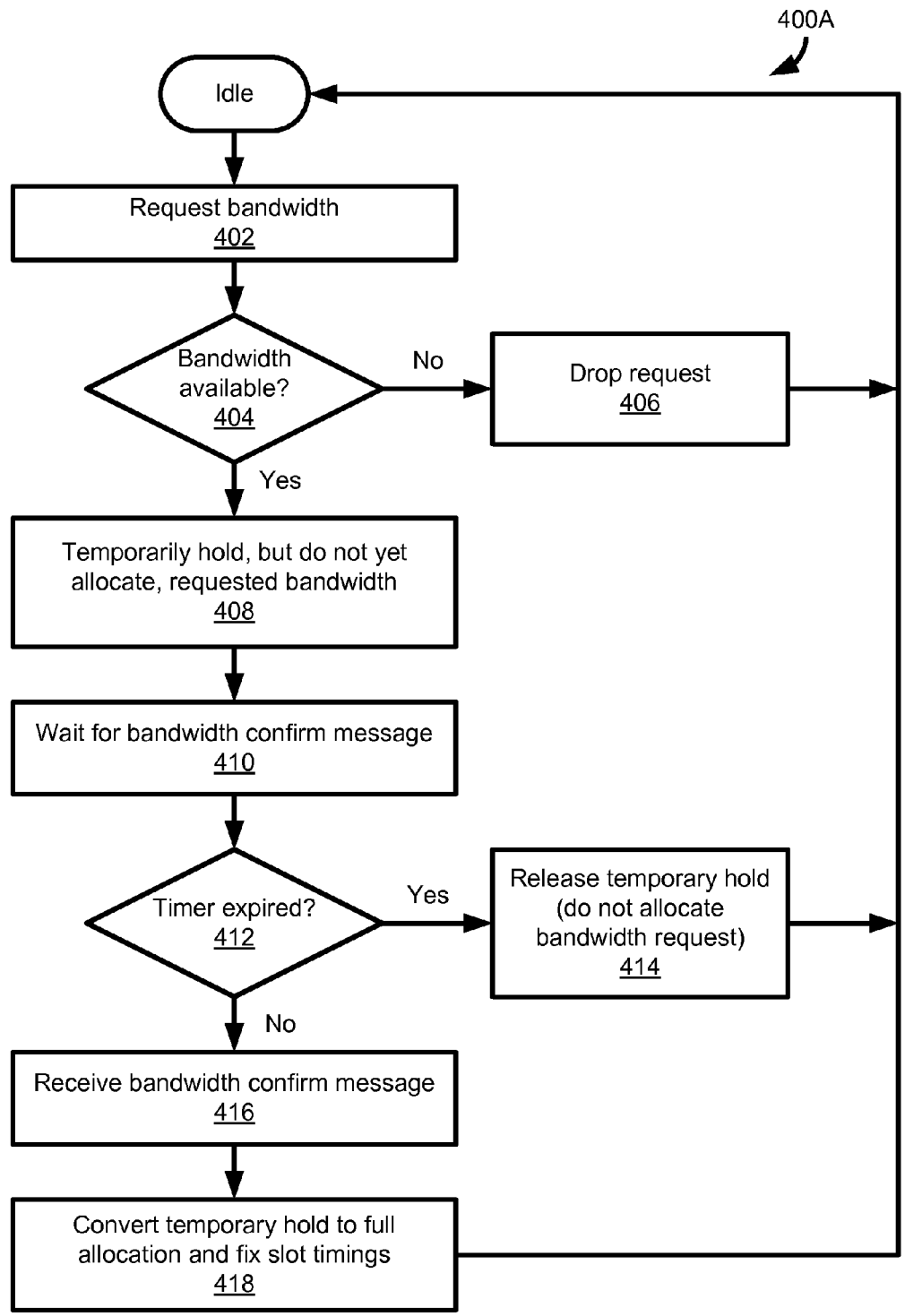
FIG. 4A is a flowchart illustrating a method performed by an intermediate node of a multi-hop path, i.e., other than a source or destination node of the multi-hop path, in accordance with the bandwidth allocation technique shown in FIGS. 3A-D.

FIG. 4A is a flowchart illustrating a floating hold method 400A performed by an intermediate node of a multi-hop path, i.e., a node other than a source or destination node of the multi-hop path, in accordance with the bandwidth allocation technique shown in FIGS. 3A-D. First, at step 402, the intermediate node receives a request for bandwidth between two nodes of the network. At decision 404, if it is determined there are no bandwidth resources available, the request is dropped at step 406. On the other hand, if bandwidth is available, the intermediate node does not allocate the requested bandwidth as soon as the request is received. Instead, it temporarily holds the request as a floating hold, as indicated by step 408. If necessary, this process of generating a temporary hold is repeated for other intermediate nodes associated with other links along the end-to-end path. Next, at step 410, the intermediate node waits for a bandwidth confirm message from the destination node of the multi-hop path. According to an aspect of the invention, the intermediate node may wait until a bandwidth-confirm message is eventually received. Alternatively, as shown at decision 412, a timer may be triggered in response to the request. If the timer expires before a bandwidth-confirm message is received from the destination node, at step 414 the temporary hold is released and the intermediate node returns to the idle state to wait for another request. However, if the intermediate node does receive a bandwidth-confirm message from the destination node prior to expiration of the timer, as indicated by step 416, at step 418 the temporary hold is converted into a fixed timeslot allocation, after which the intermediate node returns to the idle state to wait for a subsequent bandwidth request. While the intermediate node has been described as performing a single floating hold process for a single multi-hop path, the intermediate nodes and other intermediate nodes may be configured to perform such floating hold operations for multiple multi-hop paths at the same time.

Figure 4B:
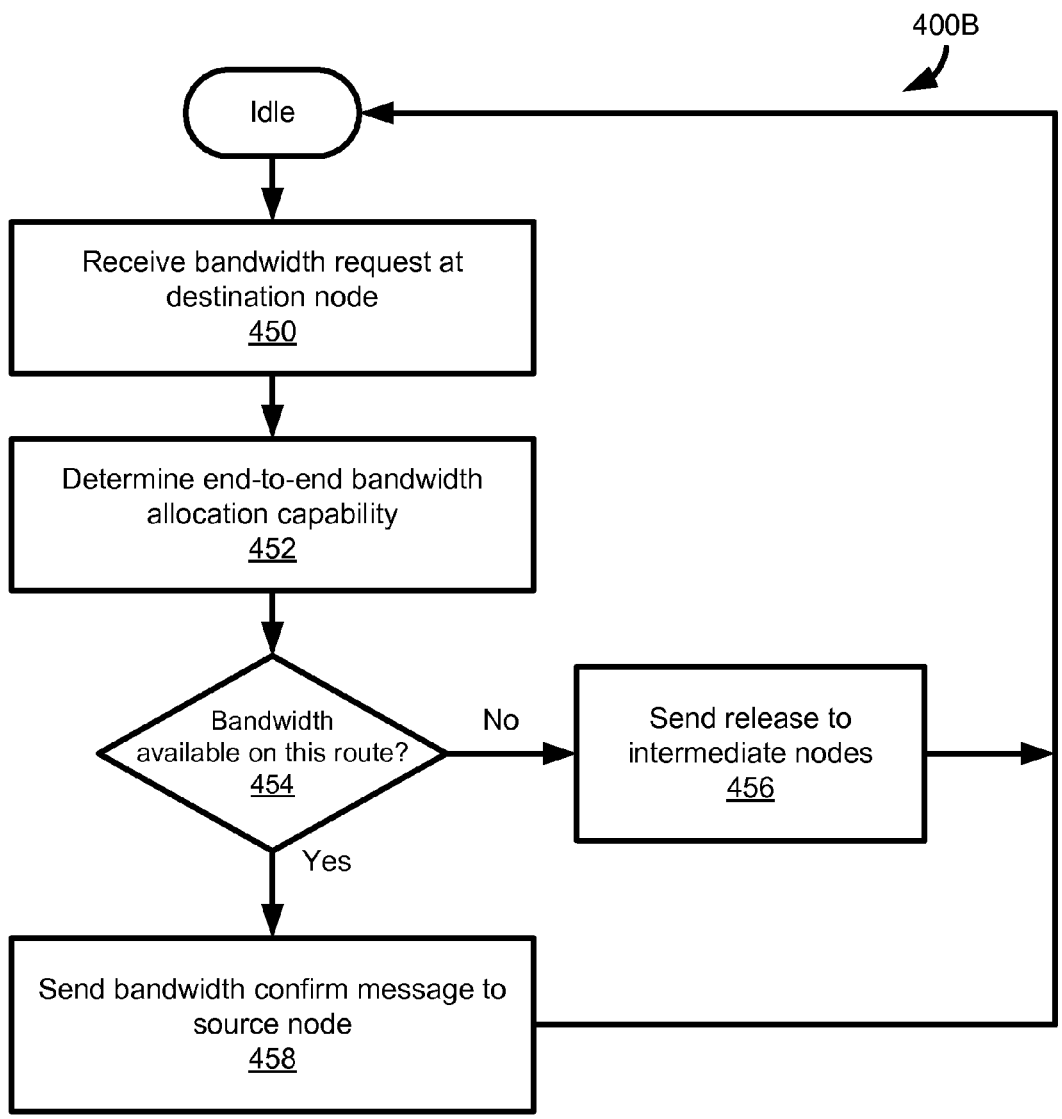
FIG. 4B is a flowchart illustrating a method performed by a destination node of a multi-hop path, in accordance with the bandwidth allocation technique shown in FIGS. 3A-D.

FIG. 4B is a flowchart illustrating a method 400B performed by the destination node of the multi-hop path in FIG. 4A, in accordance with the bandwidth allocation technique shown in FIGS. 3A-D. First, at step 450 the destination node receives the bandwidth request message. In response to the request, at step 452 the destination node determines if the end-to-end bandwidth of the multi-hop path is sufficient to accommodate the bandwidth request. At decision 454, if the bandwidth request cannot be accommodated on the path, the system instructs all intermediate nodes to release the request and the destination node returns to an idle state. On the other hand, if sufficient bandwidth resources are available, at step 458 the destination node sends a bandwidth-confirm message back to the intermediate node that originally made the bandwidth request. While the destination node has been described as processing a bandwidth request for a single multi-hop path, it may be configured to process multiple bandwidth requests for multiple multi-hop paths, in which it serves as a destination node, at the same time.

The bandwidth reservation scheme described in FIGS. 3A-D, 4A and 4B has distinct advantages over prior art bandwidth reservation schemes. The cost of tearing down an unsuccessful reservation is dramatically reduced in terms of both the CPU time, since excessive recalculation of bandwidth allocation does not need to take place, and the amount of traffic on the scarce radio resource. A further advantage is that an end-to-end teardown does not affect other stations in the clusters, as it does in prior art approaches (e.g., S3 and S6 in FIGS. 2C-E above).

Referring now to FIGS. 5A-D, there is shown a bandwidth reservation technique, according to an alternative embodiment of the present invention. Unlike the "floating hold" technique described above in connection with FIGS. 3A-D, 4A and 4B, which does not allocate bandwidth until the end-to-end bandwidth of a path has been confirmed, a failed bandwidth allocation which has been assigned to a bandwidth time is released with the attempt to allocate it to a subsequent station.

Figure 5A:
FIGS. 5A-D are bandwidth time diagrams illustrating a bandwidth allocation technique for communication networks, in accordance with an alternative embodiment of the present invention.
Figure 5B:
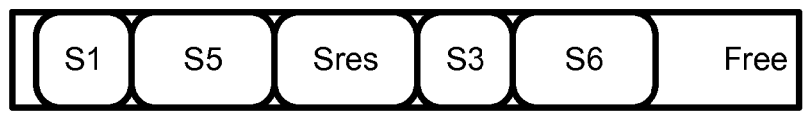
Figure 5C:
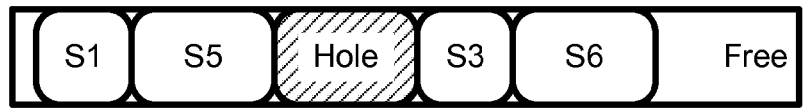
Figure 5D:
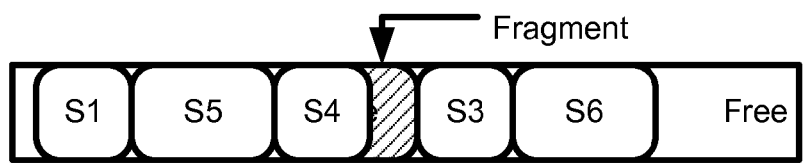

In FIGS. 5A-D "S1" and "S5" represent established/utilized station bandwidth times. In FIGS. 5A and 5B, "Sres" represents a new bandwidth time (full allocation) for the end-to-end bandwidth reservation. In FIGS. 5B, 5C and 5D, "S3" and "S6" represent station bandwidth times allocated after the Sres reserved bandwidth. In FIG. 5C, the "Hole" represents a bandwidth time released by an Sres station, due to unsuccessful end-to-end bandwidth reservation. In FIG. 5D, "S4" represents a best fit station bandwidth time occupying the Hole created by the Sres station.

Figure 6:
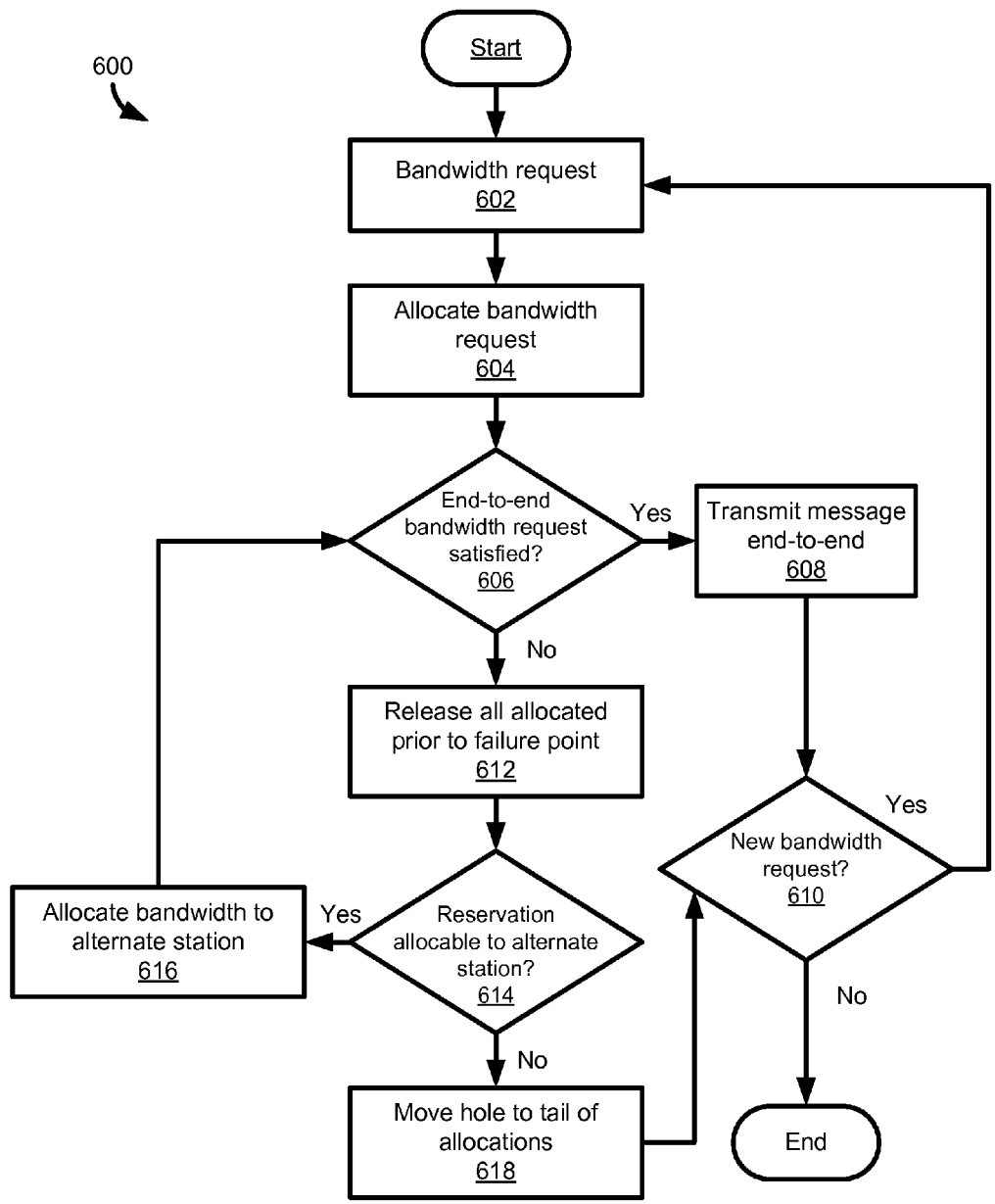
FIG. 6 is a flowchart illustrating a method of implementing the bandwidth allocation technique shown in FIGS. 5A-D, in accordance with an embodiment of the present invention.

FIG. 6 shows the bandwidth reservation technique of FIGS. 5A-D in greater detail. At a first step 602 in the method 600 a request for bandwidth between two nodes is received by a master node from an associated slave node. In response to the bandwidth request, at step 604 the master node allocates the bandwidth request (see FIG. 5A). This process of allocating bandwidths is repeated for all masters along the entire end-to-end path. Next, at decision 606 it is determined whether the end-to-end bandwidth allocations are sufficient to transmit the message from the source node to the destination node. If "yes", at step 608 the message is transmitted according to the bandwidth time allocated. Then, at decision 610 a determination is made as to whether a new bandwidth request has been made. If "yes" the method 600 resumes at step 602. If "no" the method 600 ends. If at decision 608 it is determined that the end-to-end bandwidth requirements have not been satisfied, at step 612 all bandwidth allocations made prior to the point of failure along the end-to-end path are released.

As steps 602-606 of the method 600 are being performed, and up until the time the bandwidth allocation is finally released, newer bandwidth times may have been allocated to other stations, e.g., stations S3 and S6 in FIG. 5B. This leaves a "hole" in the allocation, as shown in FIG. 5C. To avoid the prospect of an unused allocation, at decision 614 one or more of the masters along the end-to-end path determine(s) whether the unused reservation(s) can be used by one or more alternate stations. If a station is available to utilize the allocation, at step 616 the bandwidth is allocated to the one or more alternate stations, as shown in FIG. 5D. The actual bandwidth allocated to the alternate station may be less than the original allocation, which can result in unused fragments of bandwidth. However, this is favored over the allocation not being utilized at all. If decision 614 determines that there are no alternate stations capable of utilizing the allocated bandwidth, at step 618 the hole left by the unused bandwidth may be proactively moved to the tail of all the allocations (as described above with reference to FIGS. 2C-2E), after which a determination is made at decision 610 as to whether a new bandwidth request has been made. If a new bandwidth request has been made the method resumes at step 602. Otherwise, the method ends.

After the bandwidth reservations are confirmed to time slots according to one of the techniques described above, for example, the wireless system may have to adapt to link variations (e.g., signal quality variations), by reducing the rate during times when the signal quality degrades and increasing the rate when the signal quality improves. Because transmit time is inversely proportional to the transmit rate, the time slots have to be constantly readjusted according to the rate changes.

Figure 7A:
FIGS. 7A-C are bandwidth time diagrams illustrating how rate adaptation is performed on an established/utilized bandwidth time of a station bandwidth time S5ra, which is scheduled for rate adaptation.
Figure 7B:
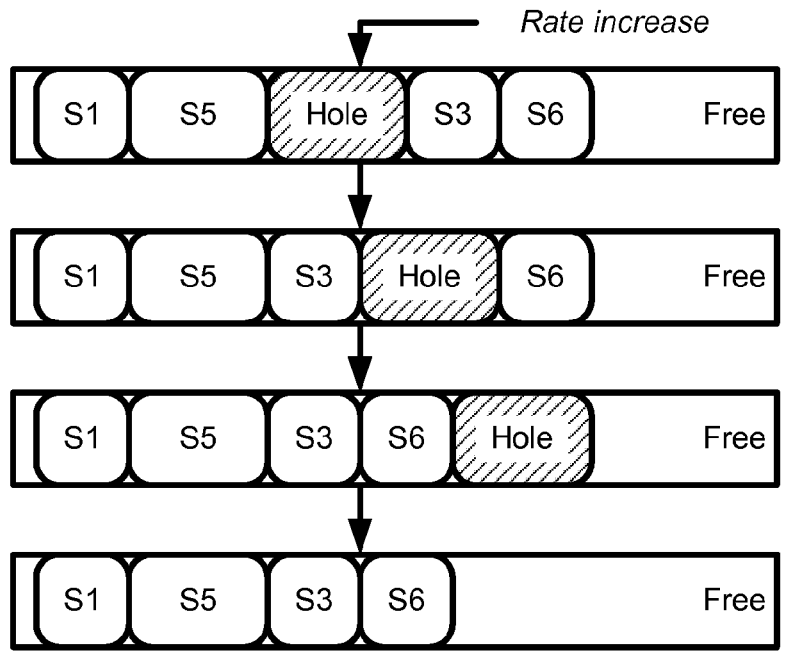
Figure 7C:
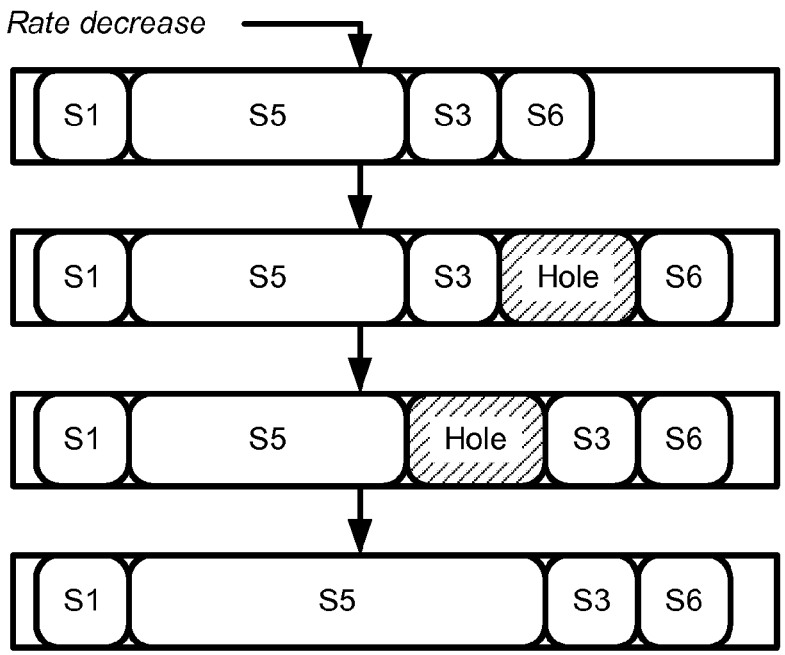

FIGS. 7A-C illustrate how rate adaptation is performed on an established/utilized bandwidth time of a station bandwidth time S5*ra*, which is scheduled for rate adaptation. FIG. 7A shows bandwidth allocations before rate adaptation is performed. Rate adaptation is performed to increase a data rate in FIG. 7B and alternatively to decrease a data rate in FIG. 7C. As shown in FIG. 7B, when the rate is increased (e.g., if link conditions improve), S5*ra* is shrunk, since it takes less time to transmit the same amount of data. Shrinking the bandwidth time creates a hole in the allocation. This hole can be purged ("bubble out") by moving the hole to the end of the allocations, as is illustrated in FIG. 7B. On the other hand, when the rate is decreased (e.g., if link conditions worsen), S5*ra* has to be expanded, as illustrated in FIG. 7C. This may be accomplished, for example, by injecting a hole at the tail of the allocations, and merging the hole with S5*ra* to create an expanded time allocation S5 ("bubble in").

As used in FIGS. 7A-C, "S1", "S3" and "S6" represent established/utilized station bandwidth times. "S5*ra*" represents an established/utilized station bandwidth time for station S5 and is scheduled for rate adaptation. "S5" represents a station bandwidth time after the rate adaptation. "Hole" represents a bandwidth time due to rate adjust (release or create depending on increase or decrease in rate).

Instead of moving the "bubble in" and "bubble out" in stages, as described above, the following process may be performed, according to an embodiment of the present invention. When a slave node (e.g., station S5) requests a master node in its cluster to adjust its bandwidth (i.e., increase or decrease), the cluster master node broadcasts a cluster-wide bandwidth adjustment announcement to all slave nodes that will be immediately affected by the adjustment (in this example stations S3 and S6). The announcement may be broadcast more than once to ensure that the affected nodes receive the announcement. According to an exemplary embodiment, the announcement is sent two times. Each slave node is required to receive only one announcement out of 2N announcements made (N represents the number of slave nodes immediately affected by the adjustment (e.g., stations S3 and S6 in the above example).

The affected slave nodes respond to the bandwidth adjustment announcement by sending a bandwidth adjustment request acknowledgment signal back to the master node. After receiving the acknowledgment signals from the slave nodes, the cluster master node sends a positive acknowledgment signal to the slave node which requested the bandwidth adjustment, and to notify the slave node of the created hole next to its slot allocation (as in FIG. 7C) or that its bandwidth time has been trimmed at its tail (as in FIG. 7B).

While the bandwidth adjustment process can be performed in various ways, according to one embodiment of the invention, a two-stage countdown process is employed. The first countdown stage is employed to allow time for the slave nodes affected by the bandwidth adjustment request to become aware of the bandwidth being adjusted and send bandwidth adjust acknowledgment signals back to the cluster master node. According to one aspect of the invention, each of the slave nodes starts a countdown on its own, based on the beacon periods (as each announcement takes exactly one beacon period), and positive acknowledgment signals in the form of a checksum of the message are sent back to the master nodes as a validation token. If the master node does not receive acknowledgments from all affected slave nodes at the expiration of the first countdown period, the first countdown may be repeated a predetermined number of additional times. If after the predetermined number of additional attempts the master node has still not received all of the acknowledgment signals, a negative acknowledge signal is sent to the slave node that requested the bandwidth adjustment and the connection(s) for the non-responding slave node(s) is/are terminated.

The second countdown stage commences after the master node receives all of the acknowledgment signals. At the end of the second countdown, the master node instructs the slave nodes to adjust their slot timings all at once.

While the above is a complete description of the preferred embodiments of the invention sufficiently detailed to enable those skilled in the art to build and implement the system, it should be understood that various additions, modifications, and equivalents may be made to the invention without departing from the spirit and scope of the invention, which is defined by the appended claims. For example, while the exemplary embodiments described herein are applicable to mesh networks, they are also applicable to other communication network topologies requiring bandwidth reservation techniques.

Further, whereas the exemplary embodiments are well suited to wireless networks, the inventions embodied by the exemplary embodiments are also applicable to wired networks. Accordingly, for these and other reasons, various modifications or changes to the specifically disclosed exemplary embodiments will be suggested to persons skilled in the art and are to be included within the spirit and purview of this application and scope of the appended claims.

What is claimed is:

1. A method of reserving bandwidth along an end-to-end path formed between a source node and a destination node in a network comprising a plurality of nodes, the method comprising:
   allocating a first time slot in a node for a first communications link in a first end-to-end path;
   receiving, at the node and after allocating the first time slot, a bandwidth request for a second communications link in a second end-to-end path;
   temporarily holding bandwidth in the node as a floating hold for the second end-to-end path, without allocating a resulting time slot, in response to the bandwidth request for the second communications link;
   receiving, at the node and after receiving the bandwidth request for the second communications link, a bandwidth request for a third communications link on a third end-to-end path;
   temporarily holding bandwidth in the node as a floating hold for the third end-to-end path, without allocating a resulting time slot, in response to the bandwidth request for the third communications link;
   determining sufficient bandwidth resources are available to accommodate the bandwidth request for the third communications link; and
   allocating the temporarily held bandwidth for the third end-to-end path to a second time slot directly adjacent to the first time slot while still holding the temporarily held bandwidth for the second end-to-end path based on the determining sufficient bandwidth resources are available to accommodate the bandwidth request for the third communications link.

2. The method of claim 1, further comprising:
   determining sufficient bandwidth resources are available to accommodate the bandwidth request for the second communications link; and
   allocating the temporarily held bandwidth for the second end-to-end path to a third time slot directly adjacent to the second time slot based on the determining sufficient bandwidth resources are available to accommodate the bandwidth request for the second communications link.

3. The method of claim 1, further comprising:
   receiving, at the node and after receiving the bandwidth request for the third communications link, a bandwidth request for a fourth communications link on a fourth end-to-end path;
   temporarily holding bandwidth in the node as a floating hold for the fourth end-to-end path, without allocating a resulting time slot, in response to the bandwidth request for the fourth communications link;
   determining sufficient bandwidth resources are available to accommodate the bandwidth request for the fourth communications link; and
   allocating the temporarily held bandwidth for the fourth end-to-end path to a third time slot directly adjacent to the second time slot while still holding the temporarily held bandwidth for the second end-to-end path based on the determining sufficient bandwidth resources are available to accommodate the bandwidth request for the fourth communications link.

4. The method of claim 1, further comprising releasing the temporarily held bandwidth for the second end-to-end path.

5. The method of claim 1, further comprising:
   determining insufficient bandwidth resources are available to satisfy the bandwidth request for the second communications link in the second end-to-end path; and
   releasing the temporarily held bandwidth for the second end-to-end path based on the determining insufficient bandwidth resources are available to satisfy the bandwidth request for the second communications link in the second end-to-end path.

6. The method of claim 1, further comprising:
   allocating a first time slot in a second node for the first communications link in the first end-to-end path;
   receiving, at the second node and after allocating the first time slot in the second node, a bandwidth request for a fourth communications link in a fourth end-to-end path;
   temporarily holding bandwidth in the second node as a floating hold for the fourth end-to-end path, without allocating a resulting time slot, in response to the bandwidth request for the fourth communications link;
   receiving, at the second node and after receiving the bandwidth request for the fourth communications link, a bandwidth request for a fifth communications link on a fifth end-to-end path;
   temporarily holding bandwidth in the second node as a floating hold for the fifth end-to-end path, without allocating a resulting time slot, in response to the bandwidth request for the fifth communications link;
   determining sufficient bandwidth resources are available to accommodate the bandwidth request for the fifth communications link; and
   allocating the temporarily held bandwidth for the fifth end-to-end path to a second time slot of the second node directly adjacent to the first time slot of the second node while still holding the temporarily held bandwidth for the fourth end-to-end path based on the determining sufficient bandwidth resources are available to accommodate the bandwidth request for the fifth communications link.

7. The method of claim 1, wherein the first communications link comprises a wireless communications link.

8. The method of claim 1, wherein the first communications link comprises a wired communications link.

9. The method of claim 1, wherein the first end-to-end path comprises a multi-hop path in a mesh network.

10. The method of claim 1, further comprising:
    allocating bandwidth for a fourth end-to-end path to a third time slot directly adjacent to the second time slot;
    releasing the second time slot of the third end-to-end path; and
    reallocating the bandwidth for the fourth end-to-end path from the third time slot to the second time slot and releasing the third time slot.

11. The method of claim 1, further comprising:
    receiving a bandwidth adjustment request;
    sending a bandwidth adjustment announcement to a second node, in response to receiving the bandwidth adjustment request;
    receiving, from the second node, a bandwidth request acknowledgment; and
    instructing the second node to adjust slot timings for a previously allocated bandwidth in response to receiving the bandwidth request acknowledgment.

12. The method of claim 11, further comprising:
wherein receiving the bandwidth adjustment request adjustment comprises receiving the bandwidth adjustment request from a third node;
wherein instructing the second node to adjust slot timings comprises instructing the second node to adjust slot timings at a time of instructing the third node to adjust slot timings.

13. The method of claim 12, wherein the second node and the third node are in a common end-to-end path.

14. The method of claim 1, wherein the first time slot and the second time slot comprise different time widths.

15. A node for reserving bandwidth along an end-to-end path formed between a source node and a destination node in a network comprising a plurality of nodes, the node using a first time slot and a second time slot and the node configured to:
allocate the first time slot in the node for a first communications link in a first end-to-end path;
receive, at the node and after allocating the first time slot, a bandwidth request for a second communications link in a second end-to-end path;
temporarily hold bandwidth in the node as a floating hold for the second end-to-end path, without allocating a resulting time slot, in response to the bandwidth request for the second communications link;
receive, at the node and after receiving the bandwidth request for the second communications link, a bandwidth request for a third communications link on a third end-to-end path;
temporarily hold bandwidth in the node as a floating hold for the third end-to-end path, without allocating a resulting time slot, in response to the bandwidth request for the third communications link;
determine sufficient bandwidth resources are available to accommodate the bandwidth request for the third communications link; and
allocate the temporarily held bandwidth for the third end-to-end path to the second time slot directly adjacent to the first time slot while still holding the temporarily held bandwidth for the second end-to-end path based on determining sufficient bandwidth resources are available to accommodate the bandwidth request for the third communications link.

16. The node of claim 15, the code further configured to:
determine sufficient bandwidth resources are available to accommodate the bandwidth request for the second communications link; and
allocate the temporarily held bandwidth for the second end-to-end path to a third time slot directly adjacent to the second time slot based on determining sufficient bandwidth resources are available to accommodate the bandwidth request for the second communications link.

17. The node of claim 15, the code further configured to:
receive, at the node and after receiving the bandwidth request for the third communications link, a bandwidth request for a fourth communications link on a fourth end-to-end path;
temporarily hold bandwidth in the node as a floating hold for the fourth end-to-end path, without allocating a resulting time slot, in response to the bandwidth request for the fourth communications link;
determine sufficient bandwidth resources are available to accommodate the bandwidth request for the fourth communications link; and
allocate the temporarily held bandwidth for the fourth end-to-end path to a third time slot directly adjacent to the second time slot while still holding the temporarily held bandwidth for the second end-to-end path based on determining sufficient bandwidth resources are available to accommodate the bandwidth request for the fourth communications link.

18. The node of claim 15, the code further configured to:
release the temporarily held bandwidth for the second end-to-end path.

19. The node of claim 15, the code further configured to:
determine insufficient bandwidth resources are available to satisfy the bandwidth request for the second communications link in the second end-to-end path; and
release the temporarily held bandwidth for the second end-to-end path based on determining insufficient bandwidth resources are available to satisfy the bandwidth request for the second communications link in the second end-to-end path.

20. The node of claim 15, wherein the first time slot and the second time slot comprise different time widths.

21. A network for reserving bandwidth along an end-to-end path formed between a source node and a destination node, the network comprising a plurality of nodes each configured to:
allocate a first time slot in a node for a first communications link in a first end-to-end path;
receive, at the node and after allocating the first time slot, a bandwidth request for a second communications link in a second end-to-end path;
temporarily hold bandwidth in the node as a floating hold for the second end-to-end path, without allocating a resulting time slot, in response to the bandwidth request for the second communications link;
receive, at the node and after receiving the bandwidth request for the second communications link, a bandwidth request for a third communications link on a third end-to-end path;
temporarily hold bandwidth in the node as a floating hold for the third end-to-end path, without allocating a resulting time slot, in response to the bandwidth request for the third communications link;
determine sufficient bandwidth resources are available to accommodate the bandwidth request for the third communications link; and
allocate the temporarily held bandwidth for the third end-to-end path to a second time slot directly adjacent to the first time slot while still holding the temporarily held bandwidth for the second end-to-end path based on determining sufficient bandwidth resources are available to accommodate the bandwidth request for the third communications link.

22. The network of claim 21, further comprising:
determine sufficient bandwidth resources are available to accommodate the bandwidth request for the second communications link; and
allocate the temporarily held bandwidth for the second end-to-end path to a third time slot directly adjacent to the second time slot based on determining sufficient bandwidth resources are available to accommodate the bandwidth request for the second communications link.

23. The network of claim 21, further comprising:
receive, at the node and after receiving the bandwidth request for the third communications link, a bandwidth request for a fourth communications link on a fourth end-to-end path;
temporarily hold bandwidth in the node as a floating hold for the fourth end-to-end path, without allocating a resulting time slot, in response to the bandwidth request for the fourth communications link;
determine sufficient bandwidth resources are available to accommodate the bandwidth request for the fourth communications link; and
allocate the temporarily held bandwidth for the fourth end-to-end path to a third time slot directly adjacent to the second time slot while still holding the temporarily held bandwidth for the second end-to-end path based on determining sufficient bandwidth resources are available to accommodate the bandwidth request for the fourth communications link.

24. The network of claim 21, further comprising:
release the temporarily held bandwidth for the second end-to-end path.

25. The network of claim 21, further comprising:
determine insufficient bandwidth resources are available to satisfy the bandwidth request for the second communications link in the second end-to-end path; and
release the temporarily held bandwidth for the second end-to-end path based on determining insufficient bandwidth resources are available to satisfy the bandwidth request for the second communications link in the second end-to-end path.

26. The network of claim 21, wherein the first communications link comprises a wireless communications link.

27. The network of claim 21, wherein the first communications link comprises a wired communications link.

28. The network of claim 21, wherein the first end-to-end path comprises a multi-hop path in a mesh network.

29. The network of claim 21, further comprising:
allocate bandwidth for a fourth end-to-end path to a third time slot directly adjacent to the second time slot;
release the second time slot of the third end-to-end path; and
reallocate the bandwidth for the fourth end-to-end path from the third time slot to the second time slot and releasing the third time slot.

30. The network of claim 21, wherein the first time slot and the second time slot comprise different time widths.

\* \* \* \* \*